United States Patent [19]

Coughlin et al.

[11] Patent Number: 5,800,732
[45] Date of Patent: Sep. 1, 1998

[54] ALL-IN-ONE TREATMENT AGENT FOR COOLING WATER

[75] Inventors: Michael F. Coughlin, Cincinnati; Lyle H. Steimel, Forest Park, both of Ohio

[73] Assignee: Diversey Lever, Inc., Plymouth, Mich.

[21] Appl. No.: 797,750

[22] Filed: Feb. 7, 1997

[51] Int. Cl.$^6$ .................................................. C02F 5/14
[52] U.S. Cl. ........................ 252/180; 210/699; 210/759; 252/181; 252/389.23; 252/389.54; 422/15
[58] Field of Search ......................... 210/698–701, 210/759, 764; 252/180, 181, 388, 389.23, 389.54; 422/15, 17, 19

[56] References Cited

U.S. PATENT DOCUMENTS

| | | | |
|---|---|---|---|
| 2,917,428 | 12/1959 | Hitzman | 167/22 |
| 3,524,612 | 8/1970 | Shems et al. | 210/63 |
| 4,209,398 | 6/1980 | Li et al. | 210/58 |
| 4,217,216 | 8/1980 | Lipinski | 210/58 |
| 4,239,622 | 12/1980 | Ridgway | 424/130 |
| 4,268,397 | 5/1981 | Horie et al. | 210/746 |
| 4,282,715 | 8/1981 | Edwall et al. | 60/646 |
| 4,311,598 | 1/1982 | Verachtert | 210/757 |
| 4,370,199 | 1/1983 | Orndorff | 162/161 |
| 4,419,246 | 12/1983 | Jayawant | 210/723 |
| 4,443,342 | 4/1984 | Stas et al. | 210/759 |
| 4,530,955 | 7/1985 | Wilson et al. | 524/434 |
| 4,532,047 | 7/1985 | Dubin | 210/698 |
| 4,709,091 | 11/1987 | Fukumoto et al. | 562/595 |
| 4,719,083 | 1/1988 | Baker et al. | 422/15 |
| 4,802,994 | 2/1989 | Moucheé et al. | 210/759 |
| 4,889,689 | 12/1989 | Tsao | 422/30 |
| 4,906,387 | 3/1990 | Pisani | 210/748 |
| 4,973,409 | 11/1990 | Cook | 210/699 |
| 4,975,109 | 12/1990 | Friedman, Jr. et al. | 71/67 |
| 5,078,672 | 1/1992 | Dougherty et al. | 494/37 |
| 5,100,558 | 3/1992 | Brown et al. | 210/699 |
| 5,147,555 | 9/1992 | Brown et al. | 210/698 |
| 5,292,449 | 3/1994 | Shyu | 252/180 |
| 5,382,367 | 1/1995 | Zinkan et al. | 210/698 |
| 5,409,713 | 4/1995 | Lokkesmoe et al. | 210/759 |
| 5,424,032 | 6/1995 | Christensen et al. | 422/14 |
| 5,662,803 | 9/1997 | Young | 210/698 |

FOREIGN PATENT DOCUMENTS 4-32788   4/1992   Japan.

Primary Examiner—Peter A. Hruskoci
Attorney, Agent, or Firm—A. Kate Huffman

[57] ABSTRACT

An all-in-one cooling water treatment composition includes a high concentration of peroxide, preferably hydrogen peroxide, in combination with a polyhydric alcohol and a phosphonate to stabilize the peroxide in a concentrated solution. The composition further includes a yellow metal corrosion inhibitor such as aromatic triazole and optionally polymeric dispersants and ferrous metal corrosion inhibitors and/or molybdate metal corrosion inhibitors. In this composition the phosphonate, preferably HEDP, acts both to stabilize the peroxide and, at the same time, provides anti-scalant treatment for the cooling tower. Due to the stability provided by the HEDP and its anti-scalant properties, this can be formulated as an all-in-one treatment composition which is stable at high concentrations and can be added to effectively control biocidal activity, scale and corrosion.

9 Claims, No Drawings

ALL-IN-ONE TREATMENT AGENT FOR COOLING WATER

BACKGROUND OF THE INVENTION

Cooling towers and other open, recirculating water systems require various treatments to prevent scale formation, microorganism formation, sludge and corrosion. Numerous biocidal compositions have been used in the past to either destroy microorganisms or inhibit growth of microorganisms. Compositions such as quaternary ammonium salts are frequently used, as are chlorine dioxide, chlorine and chlorine releasing compounds such as chlorinated isocyanurates, hypochlorites, chlorinated hydantoins and so on.

Zinkan U.S. Pat. No. 5,382,367 discloses the addition of hydrogen peroxide to a cooling tower to prevent corrosion and build-up of scale. Hydrogen peroxide itself is a strong oxidant at elevated concentrations and is effective as a biocide. Hydrogen peroxide is also environmentally innocuous. It breaks down into water and oxygen and therefore has no significant negative environmental side effects. Due to its instability, it is difficult or impossible to formulate into an all-in-one cooling water treatment composition. In fact, Zinkan U.S. Pat. No. 5,382,367 discloses the separate addition of hydrogen peroxide and corrosion inhibitor and dispersant.

Baker U.S. Pat. No. 4,719,085 discloses an all-in-one cooling water treatment, but this composition is not compatible with hydrogen peroxide. Further, Chrstensen U.S. Pat. No. 5,424,032 discloses the addition of $H_2O_2$ to a cooling tower and subsequent treatment with ultraviolet light. Again, this patent fails to disclose an all-in-one treatment composition. The $H_2O_2$ or other oxidant precursors are added separately.

SUMMARY OF THE INVENTION

The present invention is premised on the realization that an all-in-one cooling water treatment can be formulated utilizing hydrogen peroxide as an active biocide wherein the hydrogen peroxide is combined with a phosphonate such as HEDP as a stabilizer, along with an organic alcohol, preferably a glycol, an aromatic triazole for yellow metal corrosion inhibition, and optionally a ferrous metal corrosion inhibitor, and a polymeric dispersant. When formulated at a pH of 4.5 to 6.0, this can be stored at relatively high concentrations to provide a stable solution which, in turn, can be added to a water cooling tower or other open circulating water system to provide all-in-one water treatment. Further, the phosphonate provides scale inhibition and stabilizes the peroxide at high concentrations.

The objects and advantages of the present invention will be further appreciated in light of the following detailed description.

DETAILED DESCRIPTION

The present invention is an all-in-one treatment composition to prevent sludge, scale, microorganisms and corrosion in open water systems. The composition of the present invention includes a peroxide, stabilizers including at least one phosphonate, a triazole and optionally a polymeric dispersant and ferrous metal corrosion inhibitor.

Preferably, the peroxide is hydrogen peroxide. However, other peroxides can be used. These include the alkali metal peroxides such as sodium peroxide and organic peroxides such as peroxocarboxylic acids, for example peracetic acid, benzoyl peroxide, cumylhydroperoxide. However, due to cost and environmental concerns, hydrogen peroxide is preferred. The concentrated all-in-one solution will include 5% to 30% $H_2O_2$ and preferably 15% to 20% $H_2O_2$ by weight.

In addition to the peroxide, the all-in-one water treatment system of the present invention will further include an organic alcohol which acts as a stabilizing agent for the hydrogen peroxide. With a 15% to 20% solution of hydrogen peroxide, the treatment composition should have from about 1% to about 5% by weight of an organic alcohol. Preferably, the alcohol is a glycol such as ethylene glycol, propylene glycol, butylene glycol, or glycerol. Other simple alcohols such as propanol will also function.

This provides stability for the hydrogen peroxide and does not interfere with the additional compositions as discussed below.

In addition to the alcohol, the solution should include a second stabilizing agent, in particular a phosphonate. Suitable phosphonates are water-soluble phosphonates, in particular phosphonic acid substituted alkyl phosphonates. The preferred phosphonate is hydroxyethylidene-1,1-diphosphonic acid (HEDP). This acts to stabilize the peroxide in concentrated solution, as a deposit control agent, and as a corrosion inhibitor. This should be present in an amount from about 0.5% to about 3% on an actives basis. The phosphonate in combination with the glycol are intended to provide long-term storage stability for the hydrogen peroxide. Further, these improve the stability of $H_2O_2$ in the cooling system.

For use in applications where yellow metal is present, the all-in-one water treatment composition of the present invention further includes a yellow metal corrosion inhibitor. Preferred yellow metal corrosion inhibitors are the aromatic azole corrosion inhibitors. These include benzotriazole, $C_1$–C10 alkylbenzotriazole such as tolyltriazole and thiazoles such as mercaptobenzothiazole. The preferred azole corrosion inhibitors are benzotriazole and tolyltriazole. The aromatic azole corrosion inhibitors should be present in a percentage of about 0.5% to about 5% by weight, with about 1% being preferred.

Further, the present invention can include a ferrous metal corrosion inhibitor. Ferrous metal corrosion inhibitors include the phosphonic acids such as hydroxyphosphonic acetic acid. Other ferrous metal corrosion inhibitors useful in the present invention include water soluble polymeric dispersants. Typically these polymeric dispersants are modified polyacrylates such as phosphonated polyacrylates. Suitable substituted polyacrylates are commercially available, such as Belcene 494, which is a phosphonate, sulfonate substituted polycarboxylic acid. These are used in an amount from about 2% to about 20% in the concentrated solution. Belcen 494 can be purchased from FMC Corporation.

Optionally, the all-in-one treatment composition of the present invention can include the alkali metal orthophosphates, alkali metal polyphosphates which inhibit ferrous metal corrosion.

Further, in compositions where the cooling towers employ low hardness or low alkalinity water, a molybdate corrosion inhibitor can be added. Preferably, this would be sodium molybdate present in an amount from about 0.5% to about 5%.

To formulate the all-in-one treatment composition of the present invention, the individual components are added to a solution of hydrogen peroxide at concentrations effective to establish the desired use concentration. Sodium hydroxide or potassium hydroxide are added to establish a pH from about 4.5 to 6.0 to maintain the components in solution. A preferred formulation is:

| | |
|---|---|
| Deionized water | 34% |
| TT50 (Tolyltriazole 50% Actives) | 1% |
| Belcene 494 (50% Actives) | 10% |
| Dequest 2010 (55% Actives) | 5% |
| Acumer 2000 (50% Actives) | 5% |
| KOH (45% Actives) | 5% Provides pH of 5.0 |

The concentrated solution is added to a cooling tower or other open recirculating water system so that the following individual concentrations are established:

| | Range: | Preferred: |
|---|---|---|
| Peroxide | 1 to 100 ppm | 1 to 10 ppm |
| Triazole | 1 to 10 ppm | 1 to 5 ppm |
| Phosphonate | 1 to 20 ppm | 5 to 15 ppm |
| Polymeric Dispersant | 1 to 20 ppm | 5 to 15 ppm |
| Ferrous Metal Corrosion Inhib. | 0 to 20 ppm | 5 to 15 ppm |
| Molybdate | 0 to 20 ppm | 2 to 10 ppm |
| Inorganic Phosphate | 0 to 20 ppm | 5 to 15 ppm |

It is desirable, in turn, to have a residual peroxide concentration of 2–10 ppm. A feed rate of 50 ppm should achieve this. Further, the pH of the cooling tower should be maintained at 6.5 to 9.0 to maximize stability of the peroxide.

EXAMPLE 1

Two formulations, one for use with soft water and one for use with hard water, were formed.

| Formula for Soft Water | | Formula for Hard Water | |
|---|---|---|---|
| Demineralized Water | 25% | Demineralized Water | 33% |
| Tolyltriazole | 1% | Tolyltriazole | 1% |
| 50% Hydrogen Peroxide | 35% | 50% Hydrogen Peroxide | 35% |
| Belcor 575 | 10% | KH$_2$PO$_4$ | 5% |
| Dequest 2010 | 5% | Dequest 2010 | 5% |
| Acumer 2000 | 5% | Acumer 2000 | 10% |
| Ethylene Glycol | 5% | Ethylene Glycol | 5% |
| 45% Potassium Hydroxide | 14% | 45% Potassium Hydroxide | 6% |

Both of these formulations were stored for 224 days at 20°–25° C. without loss of peroxide activity.

EXAMPLE 2

In order to test the efficacy of the present invention, the following formulation was prepared.

| Ingredient | % w/w |
|---|---|
| Demineralized Water | 34 |
| Tolyltriazole | 1 |
| 50% Hydrogen Peroxide* | 35 |
| Belcene 494 | 10 |
| Dequest 2010 | 5 |
| Acumer 2000 | 5 |
| Ethylene Glycol | 5 |
| 45% Caustic Potash | 5 |

*The H$_2$O$_2$ was fed separately for control purposes.

This was fed to a cooling tower. Table 1 provides the heterotrophic plate counts (bacteria/ml), and Table 2 provides the "Corrosion as a Function of Treatment" regime data.

TABLE 1

| Run Time Hours | Bacteria CFU's/mL* | Hydrogen Peroxide ppm |
|---|---|---|
| 2 | 1600 | 26 |
| 24.48 | 2600 | 49 |
| 48.74 | 1200 | 42 |
| 76.88 | 12300 | 28 |
| 95.65 | 59000 | 8 |

*CFU's = Colony Forming Units

TABLE 2

| | 14-Day Corrosion Rates (mpy)* |
|---|---|
| Mild Steel | 1.02 |
| Mild Steel | 1.08 |
| Copper | 0.25 |
| Copper | 0.29 |

*Average hydrogen peroxide concentration (ppm) = 2.4 ppm

This demonstrates that the formulation of the present invention is excellent at controlling bacteria, whereas the corrosion caused by the treatment is within acceptable limitations. Thus the present invention provides total treatment for a cooling tower using a blended treatment composition. The hydrogen peroxide remains stable, even when stored with the remaining components of the composition. This, in turn, provides an effective, easy way to treat cooling tower water.

The preceding has been a description of the present invention along with preferred methods of practicing the present invention.

However, the invention itself should only be defined by the appended claims wherein we claim:

1. A concentrated, all-in-one cooling water treatment composition comprising from about 5% to about 30% by weight peroxide;

a phosphonate in an amount effective to stabilize said peroxide in said treatment composition;

an amount of an alcohol selected from the group consisting of ethylene glycol, propylene glycol, butylene glycol, and glycerol effective to further stabilize said peroxide; and a corrosion inhibitor selected from the group consisting of aromatic azoles and molybdates.

2. The composition claimed in claim 1 wherein said alcohol is propylene glycol.

3. The composition claimed in claim 2 wherein said phosphonate is hydroxyethylidene diphosphonate.

4. The composition claimed in claim 2 further including an amount of an aromatic azole effective to provide yellow metal corrosion control.

5. The composition claimed in claim 1 wherein said peroxide is hydrogen peroxide.

6. The composition claimed in claim 1, further comprising 0.5% to about 5% molybdate.

7. The composition claimed in claim 1 further comprising 1% to 20% polymeric dispersant.

8. The composition claimed in claim 1 further comprising 1% to 20% phosphonocarboxylic acid.

9. The composition claimed in claim 1 comprising from about 15% to about 20% peroxide.

* * * * *